Sept. 11, 1928.
J. A. FRISK
CREAM SEPARATOR
Filed May 6, 1927
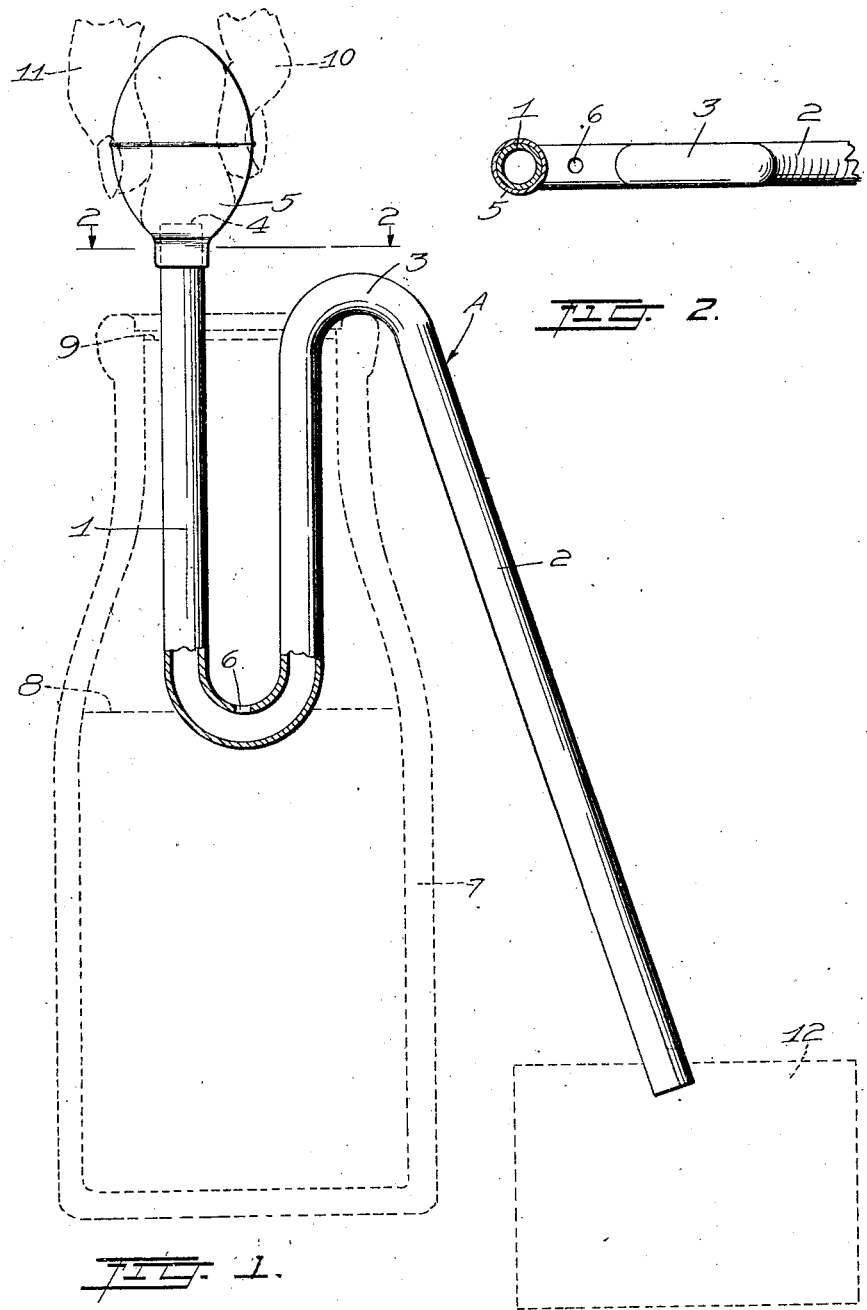
INVENTOR
J. A. FRISK
BY
ATTORNEYS Patented Sept. 11, 1928.

1,683,882

UNITED STATES PATENT OFFICE.

JOHN ALEXANDER FRISK, OF CHICAGO, ILLINOIS.

CREAM SEPARATOR.

Application filed May 6, 1927. Serial No. 189,345.

My invention relates to improvements in cream separators, and it consists in the combinations, constructions, and arrangements herein described and claimed.

An object of my invention is to provide a cream separator which will readily transfer the cream from a milk bottle into a container.

A further object of my invention is to provide a device of the type described by means of which the cream may be taken from the bottle without touching the hand of the operator, thus making the device sanitary.

A further object of my invention is to provide a device of the type described which is simple in construction, durable and efficient for the purpose intended, and which is inexpensive to manufacture.

Other objects and advantages will appear in the following specification, and the novel features of the invention will be particularly pointed out in the appended claim.

My invention is illustrated in the accompanying drawings, forming part of this application, in which Figure 1 is a side elevation of my device as applied to a milk bottle, and Figure 2 is a section along the line 2—2 of Figure 1.

In carrying out my invention, I provide a body portion indicated generally at A. The body portion A is in the form of a tube and is provided with a U-shaped portion 1 and a downwardly extending portion 2 which are joined by an arcuate-shaped resting portion 3. The free end of the U-shaped portion 1 extends above the resting portion 3 to a point indicated at 4. A resilient bulb 5 is disposed upon the free end of the U-shaped member 1 for a purpose hereinafter described. An opening 6 extends through the body portion A at the curved portion of the U-shaped member 1.

From the foregoing description of the various parts of the device, the operation thereof may be readily understood. I have shown a milk bottle 7 which is filled to the line 8 with milk and from the line 8 to the line 9 with cream. By gripping the bulb 5 between the thumb, indicated at 10, and a finger, indicated at 11, and depressing the bulb, as shown in dotted lines, the operator may place the U-shaped portion 1 within the bottle 7 allowing the arcuate-shaped resting portion 3 to rest upon the top of the bottle. As the U-shaped portion 1 is lowered into the bottle, a portion of the cream will pass through the opening 6 and seek a level in the U-shaped portion in alignment with the line 9. By releasing the bulb 5, the walls of the bulb will move outwardly to their normal positions, creating a vacuum therein which will draw a portion of the cream through the opening 6 and up through the U-shaped portion 1 toward the bulb 5. This vacuum is sufficient to draw a portion of the cream to a point substantially adjacent the end 4 which is above the arcuate-shaped resting portion 3. Therefore, the weight of the cream in the bulb side of the U-shaped portion 1 is greater than the weight of the cream in the opposite side, and during the movement of the cream in the U-shaped portion to seek a common level, the cream will be forced through the arcuate-shaped resting portion 3 where it will create a vacuum and cause a continuous flow of the cream through the body portion and into a receptacle indicated generally at 12 until the entire body of cream has passed through the opening 6 and out through the portion 2.

It is obvious that any predetermined amount of the cream may be taken from the bottle by holding the device at the desired level within the bottle, that is, positioning the opening 6 at a point beneath the quantity of cream desired. It is obvious that the cream when passing from one side of the U-shaped portion to the other will not pass through the opening 6 but will be forced against the opposite wall of the U-shaped portion.

In order to insure the operation of the device, it is sometimes advisable after the liquid has been drawn up into the tube by the release of the pressure to compress the bulb again. This then exerts a positive pressure which tends to start the operation, after which the pressure on the bulb may be released and the device will continue to operate drawing the cream out.

I claim:

A device of the type described comprising a body portion formed of a single piece of hollow tubing and having a U-shaped portion and a substantially parallel outlet portion, said U-shaped portion having side portions connected by an arcuate-shaped lower portion, said arcuate-shaped lower portion having an opening through the top wall thereof, said outlet portion being joined to one of said side portions by an arcuate-shaped connecting portion, and a bulb disposed upon the end of the other side portion, said U-shaped portion being adapted to be disposed in a receptacle containing a liquid, said opening allowing a portion of the liquid in said receptacle to pass therethrough into said U-shaped portion, said bulb being adapted to force a portion of the liquid in said U-shaped portion into said outlet portion, the movement of the liquid in said outlet portion drawing the liquid in the receptacle above the opening, through the opening, through one side portion of said U-shaped portion, and through said outlet portion.

JOHN ALEXANDER FRISK.